(No Model.)
J. J. WALDNER.
INDICATOR FOR ENGINES.
No. 584,432.  Patented June 15, 1897.
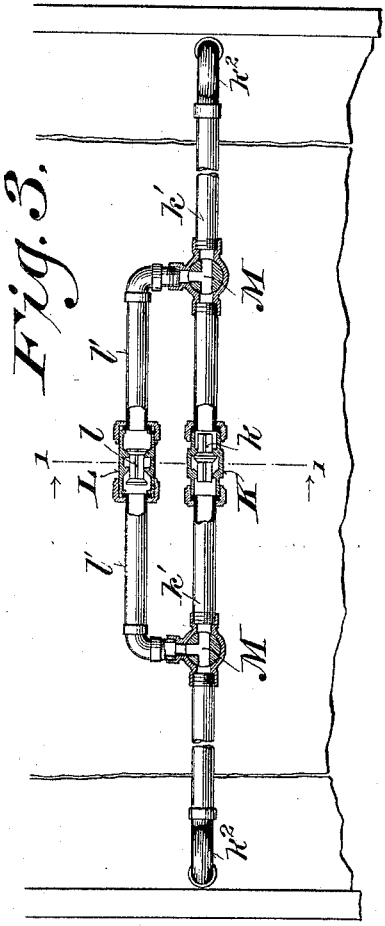
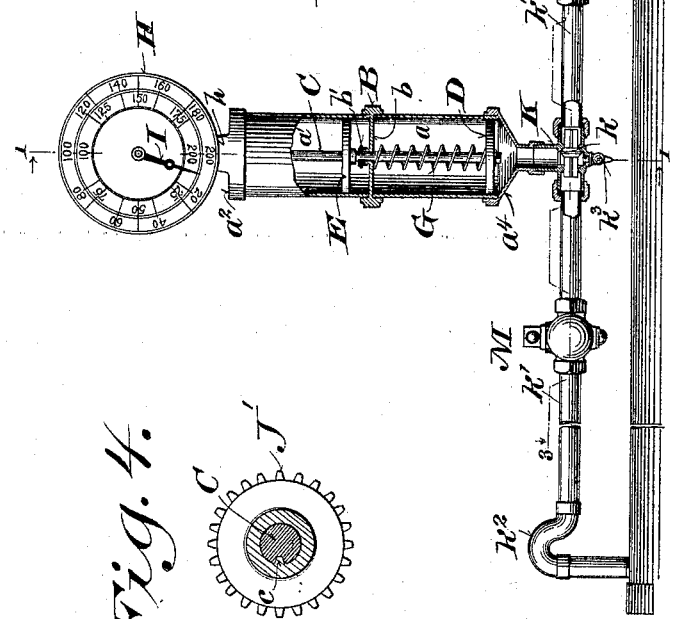
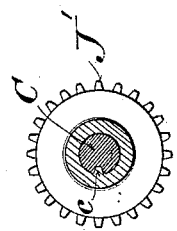
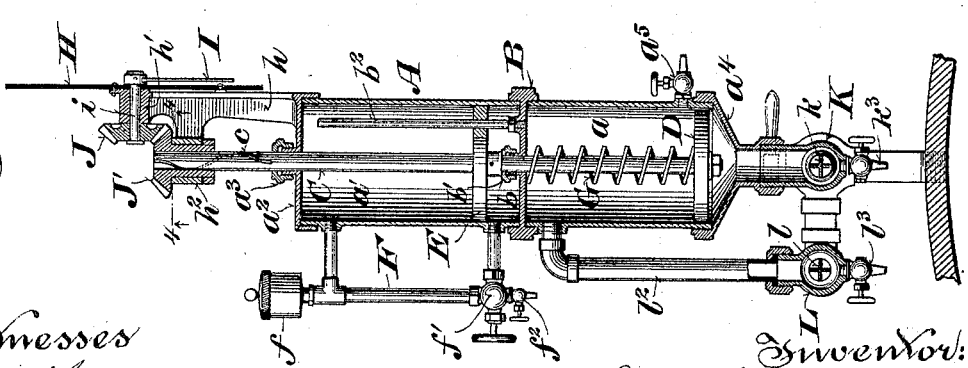

UNITED STATES PATENT OFFICE.

JOHN J. WALDNER, OF MILLTOWN, SOUTH DAKOTA.

INDICATOR FOR ENGINES.

SPECIFICATION forming part of Letters Patent No. 584,432, dated June 15, 1897.

Application filed April 13, 1894. Renewed October 22, 1896. Serial No. 609,763. (No model.)

*To all whom it may concern:*

Be it known that I, JOHN J. WALDNER, of Milltown, in the county of Hutchinson and State of South Dakota, have invented certain new and useful Improvements in Indicators for Engines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to directly ascertain the mean effective pressure or the indicated horse-power of engines without computation.

It consists, essentially, of a cylinder having two chambers, one adapted to be connected with the ends of the engine-cylinder and the other to contain oil or other suitable liquid, a piston-rod provided with two pistons, one in each chamber, an index connected with the piston-rod, and a suitably-graduated dial upon which said index is arranged to indicate the pressure in the engine-cylinder or the horse-power of the engine to which the indicator is attached, and of certain novel features in the construction and arrangement of the component parts of the device and its connections, as hereinafter particularly described, and pointed out in the claims.

In the accompanying drawings like letters designate the same parts in the several figures.

Figure 1 is a vertical section of my improved indicator and its connections, taken in a plane transverse to the engine-cylinder to which the indicator is attached. Fig. 2 is a front elevation and partial vertical section of the device as seen from the side of the engine-cylinder. Fig. 3 is a plan view and partial horizontal section of the connections of the indicator with the ends of the engine-cylinder; and Fig. 4 is a sectional detail on the line 4 4, Fig. 1.

Referring to Figs. 1 and 2, A designates the indicator-cylinder, which is composed of two sections connected end to end with each other by a coupling B and divided by an intermediate partition $b$ into two chambers $a$ and $a'$. It has at its upper end a head $a^2$, provided with a stuffing-box $a^3$, and at its lower end a head $a^4$, formed with a threaded neck, by which it is connected, as hereinafter explained, with the engine-cylinder.

C is a piston-rod which passes through the stuffing-box $a^3$ in the upper head, a stuffing-box $b'$ in partition B, and is provided in chamber $a$ with a piston D, which may be designated the "actuating-piston," and in chamber $a$ with a piston E, which may be designated the "check-piston." A by-passage is provided around the check-piston E between opposite ends of chamber $a'$ by a pipe F, which is provided at its upper end with a cup $f$, having a screw-cap or stopper, and at is lower end with a regulating-valve $f'$ and a drip-cock $f^2$. By means of the cup $f$ chamber $a'$ may be filled with oil or other liquid. By means of the drip-cock $f^2$ the liquid may be withdrawn from said chamber, and by means of the valve $f'$ the flow of liquid from one end of the chamber into the other may be regulated as desired. A by-passage may be provided between opposite ends of chamber $a'$ through an opening in piston E instead of by the pipe F.

G is a helical spring placed upon the piston-rod between the piston D and partition $b$. It acts in opposition to the direct steam-pressure or the vacuum to which the piston D is subjected and tends to return the pistons D and E to and hold them in the positions in which they are shown.

The cylinder A is provided at or near its lower end with a drip-cock $a^5$, by means of which water produced by condensation in chamber $a$, above piston D, may be withdrawn.

H is a graduated dial which may be attached to a bracket $h$, formed with or secured to the head $a^2$ of the indicator-cylinder.

I is an index-hand fixed on a spindle $i$, which is journaled in a sleeve $h'$ of bracket $h$, concentric with said dial.

J is a bevel-gear fixed on the index-spindle $i$ in engagement with a similar gear J', the hub of which is journaled in a sleeve $h^2$ of said bracket $h$. The upper projecting end of the piston-rod C passes loosely through the hub of gear J' and is formed with a spiral groove $c$, which engages with a key or projection therein, as shown in Fig. 4. This spiral is constructed and arranged to produce one revolution of the index-hand I to each single stroke of piston D. To prevent the piston-rod C from turning and to cause the spiral $c$ to produce the required rotation of gear J', I provide a guide-rod $b^2$, which passes through a hole in piston E and is secured at one end parallel with the piston-rod in partition $b$.

The dial H may be provided with an inner scale to designate the mean effective pressure or the pressure per square inch on the engine-piston and when the diameter and speed of the engine-piston are given with an outer scale to designate the indicated horse-power of the engine. The indicator is designed for permanent attachment to an engine and is connected with the opposite ends of the cylinder in the following manner: The neck at the lower end of the indicator-cylinder is screwed to the middle branch of a T-coupling and valve-case K, which is provided with a double-acting check-valve $k$ and connected by pipes $k'$ $k'$ with opposite ends of the engine-cylinder. The connections between said pipes and the ends of the cylinder are made through bends, which prevent steam condensed in the indicator and its connections from flowing back into the engine-cylinder and avoid loss of steam. The valve $k$ is constructed and arranged to automatically open communication between the indicator and that end of the engine-cylinder to which steam is admitted, and vice versa. L is a similar T-coupling and valve-case provided with a double-acting check-valve $l$ and connected at opposite ends by pipes $l'$ $l'$ with the pipes $k'$ $k'$ between the check-valve $k$ and the bends $k^2$, as shown in Fig. 3. The middle branch of the valve-case L is connected by a pipe $l^2$, as shown in Fig. 1, with the upper end of the lower chamber $a$ in the indicator-cylinder. At the junction of the pipes $k'$ and $l'$ I provide three-way cocks M M, by means of which communication between either or both of the valve-cases K and L and opposite ends of the engine-cylinder may be opened or closed. The valve $l$ is constructed and arranged to automatically and alternately open and close communication between opposite ends of the engine-cylinder and chamber $a$ of the indicator, closing toward the end of the engine-cylinder into which live steam is admitted and opening toward the end which is open to exhaust. To the lower sides of the valve-cases K and L are attached drip-cocks $k^3$ and $l^3$.

My improved indicator operates as follows: To ascertain the mean effective pressure upon the engine-piston, the three-way cocks M M are turned, as shown in Fig. 3, so as to establish communication through both double-acting check-valves between the indicator and opposite ends of the engine-cylinder. Chamber $a'$ is filled by means of the cup $f$ with oil or other suitable liquid, and the valve $f'$ is adjusted to properly regulate the flow of the liquid from one end of said chamber into the other and to check the movement of piston E, so as to cause the index-hand I to indicate on the dial H the average pressure exerted on piston D during each single stroke of the engine-piston. The end of the engine-cylinder to which steam is admitted communicates through the valve-chamber K and its connections with the lower end of chamber $a$, and the end of the engine-cylinder which is open to exhaust communicates through the valve-chamber L and its connections with the upper end of chamber $a$. The pressures exerted on opposite sides of piston D therefore correspond with the pressures exerted on opposite sides of the engine-piston, and the difference between these pressures will be the effective pressure, the average of which is the mean effective pressure indicated by the index I on the inner scale of dial H. If the dial is provided with the proper scale corresponding with the diameter and speed of the piston of the engine to which the indicator is attached, the horse-power of the engine will be directly indicated by said index on the outer scale.

To ascertain the average vacuum produced in the engine-cylinder, the three-way cocks are turned so as to close communication between the lower end of chamber $a$ and the engine-cylinder through the valve-chamber K and its connections and to open communication between the upper end of said chamber $a$ and the engine-cylinder through the valve-chamber L and its connections, and the drip-cock $k^3$ is opened. The same vacuum being now produced in chamber $a$ above piston D as is produced in the ends of the engine-cylinder open to exhaust, and the lower side of piston D being exposed through the opening of the drip-cock $k^3$ to atmospheric pressure, said piston will be moved upwardly according to the intensity of the vacuum, and the mean or average vacuum during any single stroke of the engine-piston will be indicated by the index I on the inner scale of dial H.

The mean vacuum or back pressure may be ascertained by first closing communication between the indicator and the engine-cylinder through the valve-chamber L and opening it through the valve-chamber K and taking the readings indicated by the index on the dial giving the mean direct pressure on the engine-piston. Communication is then opened between the indicator and the engine-cylinder through both check-valves, and if the indicated pressure is greater than that previously obtained the difference will be the mean vacuum. If it is less, the difference will be the mean back pressure.

Initial or terminal pressures on the engine-piston may be ascertained by fully opening the regulating-valve $f'$, or chamber $a'$ may be emptied and the oil-cup $f$ and drip-cock $f^2$ opened, so as to oppose no check to the movement of piston E.

Various changes in minor details of construction and arrangement of the component parts of my indicator and in the mode of connecting it with an engine-cylinder may be made within the intended scope of my invention. It is obvious that with little or no change the indicator may be connected with either side or the bottom instead of the top of the engine-cylinder, as shown.

I claim—

1. In an indicator for engines, the combination of a cylinder having two chambers, one having connections at or near its ends for attachment to opposite ends of an engine-cylinder, and the other adapted to contain a retarding fluid, a piston-rod provided with two pistons, one in each chamber, a spring acting in opposition to the direct steam-pressure, and an index connected with said piston-rod, substantially as and for the purposes set forth.

2. In an indicator for engines, the combination of a cylinder comprising two chambers, one having a connection at one end for attachment to the engine-cylinder and the other provided with a by-passage between its opposite ends, a piston-rod provided with two pistons, one in each of said chambers, and an index connected with said piston-rod, substantially as and for the purposes set forth.

3. In an indicator for engines, the combination of a cylinder comprising two chambers, one of which has a connection for attachment to the engine-cylinder and the other a by-passage between opposite ends provided with a regulating-valve, a piston-rod provided with two pistons, one in each of said chambers, and an index connected with said piston-rod, substantially as and for the purposes set forth.

4. In an indicator for engines, the combination of a cylinder comprising two chambers separated from each other by a perforated partition, one having a connection for attachment to the engine-cylinder and the other a by-passage between its opposite ends and means of filling and emptying it with a liquid, a piston-rod provided with pistons, one in each of said chambers, a spring acting upon said pistons in opposition to the direct steam-pressure, and an index connected with said piston-rod, substantially as and for the purposes set forth.

5. In an indicator for engines, the combination of a cylinder comprising two chambers, one of which has a connection with opposite ends of the engine-cylinder, a double-acting check-valve in said connection, a piston-rod provided with pistons, one in each of said chambers, and an index connected with said piston-rod, substantially as and for the purposes set forth.

6. In an indicator for engines, the combination of a cylinder comprising two chambers, a piston-rod provided with pistons, one in each of said chambers, an index connected with said piston-rod, and a connection between one of said chambers and opposite ends of the engine-cylinder, provided with a double-acting check-valve which is constructed and arranged to automatically close communication between the indicator and the end of the engine-cylinder which is open to exhaust, and to open communication between the indicator and the end of the engine-cylinder to which steam is admitted, substantially as and for the purposes set forth.

7. In an indicator for engines, the combination of a cylinder comprising two chambers, a piston-rod provided with pistons, one in each of said chambers, an index connected with said piston-rod, and a connection between the indicator and opposite ends of the engine-cylinder, provided with a double-acting check-valve which is constructed and arranged to automatically open communication between the indicator and the end of the engine-cylinder which is open to exhaust, and to close communication with the opposite end of said cylinder, substantially as and for the purposes set forth.

8. In an indicator for engines, the combination of a cylinder having two chambers, one having a steam connection for attachment to an engine-cylinder, and the other adapted to contain a retarding fluid and having a by-passage between its ends, a piston-rod provided with pistons, one in each chamber, and formed with a spiral at its projecting end, a spring acting upon said piston-rod and pistons in opposition to the direct steam-pressure, an index fixed to a rotary spindle, and a bevel-gear supported by a suitable bearing in line with said piston-rod in engagement with a similar gear on the index-spindle, the piston-rod passing loosely through and the spiral thereof engaging with the hub of said first-mentioned gear, substantially as and for the purposes set forth.

9. In an indicator for engines, the combination with a cylinder comprising two chambers, one having a steam connection for attachment to an engine-cylinder, and the other adapted to contain a retarding fluid and having a by-passage between its ends, a piston-rod provided with a piston in each of said chambers and formed at its projecting end with a spiral, a spring acting upon said piston-rod and pistons in opposition to the direct steam-pressure, a graduated dial provided with one or more scales, and an index mounted on a rotary spindle concentric with said dial and connected with the piston-rod by a pair of bevel-gears, the spiral of said rod engaging loosely with the hub of one of said gears, substantially as and for the purposes set forth.

10. In an indicator for engines, the combination of a cylinder comprising two chambers, one of which has connections at opposite ends with opposite ends of the engine-cylinder, double-acting check-valves placed in said connections, one being constructed and arranged to close toward the exhaust and the other toward the admission end of the engine-cylinder, a piston-rod provided with pistons, one in each of said chambers, and an index connected with said rod, substantially as and for the purposes set forth.

11. In an indicator for engines, the combination of a cylinder provided with a piston, an index connected with said piston, connections between said cylinder on opposite sides of said piston with opposite ends of the engine-cylinder, double-acting and oppositely-operating check-valves placed in said connections, and three-way cocks at the junction of said connections, arranged to open or close communication between either or both of said check-valves and the engine-cylinder, substantially as and for the purposes set forth.

12. In an indicator for engines, the combination of a cylinder provided with a piston, an index or registering device connected with said piston, and a connection with said cylinder for attachment to opposite ends of an engine-cylinder provided with valve mechanism constructed and arranged to automatically open and close communication alternately between the indicator-cylinder and opposite ends of the engine-cylinder, substantially as and for the purposes set forth.

13. In an indicator for engines, the combination of a cylinder provided with a piston, an index or registering device connected with said piston, and connections with said cylinder on opposite sides of said piston for attachment to opposite ends of an engine-cylinder, provided with automatic valve mechanism constructed and arranged to alternately open and close communication between opposite ends of the indicator-cylinder and opposite ends of the engine-cylinder, substantially as and for the purposes set forth.

In testimony that I claim the foregoing as my own I affix my signature in presence of two witnesses.

JOHN J. WALDNER.

Witnesses:
M. E. SPOONER,
DAVID WALDNER.